UNITED STATES PATENT OFFICE.

PIERRE-ARMAND BRANGIER, OF AGNEWS, CALIFORNIA.

PROCESS FOR MANUFACTURING PURIFIED POTABLE SPIRITS.

969,332.  Specification of Letters Patent.  Patented Sept. 6, 1910.

No Drawing.  Application filed June 2, 1908.  Serial No. 436,230.

*To all whom it may concern:*

Be it known that I, PIERRE-ARMAND BRANGIER, citizen of France, residing at Agnews, in the county of Santa Clara and State of California, have invented new and useful Improvements in Processes for Manufacturing Purified Potable Spirits, of which the following is a specification.

My invention relates to a process for the manufacture of potable spirits, such as whiskies, brandies, rums, etc., free from noxious impurities.

In the manufacture of any alcoholic liquid, spirit, alcohol, whisky, brandy, rum, etc., the mash, whatever its character, after having been fermented, is sent through a still of more or less complicated character, and heated, so that the ethyl alcohol is practically entirely removed by vaporization from the mash, and afterward condensed into liquid form.

During the process of vaporization of the ethyl alcohol many other substances contained in the mash are also vaporized. The distilled liquid thus contains: First:—the ethyl alcohol; second,—some water which is condensed at the same time with the alcohol, and which carries the flavor of the particular mash which is being distilled; and third:—such impurities as are present, or have been formed during the process of fermentation, and at the same time with the ethyl alcohol; such impurities being known under the generic names of ethers, aldehydes, fusel oils, etc.

The ethyl alcohol by itself is not poisonous, neither is the water, but the impurities are very poisonous and noxious, and many processes have been devised to remove these impurities from the distilled liquids in order to give to the trade an ethyl alcohol as free as possible from said impurities. Such an ethyl alcohol, freed from these impurities, when prepared as a liquor, can be consumed immediately. When these impurities have not been removed from the distilled liquid as in the case of whisky, brandy, rum, etc., it takes many years of aging, as it is usually termed, before the distilled liquid is fit for drinking.

The purpose of the present invention is to manufacture the class of alcoholic liquids above mentioned, viz. whiskies, brandies, rums, etc., free from the above poisonous impurities, but retaining the particular flavors which differentiate every one of them, and give to each its particular characteristic.

In carrying out my process, I prepare the various mashes referred to as they are usually prepared, and, for distilling them, I employ any suitable and well known continuous distilling apparatus usually employed, the distillation being conducted exactly in the same way, and at the same temperature as it is usually conducted. I have, consequently, not shown any apparatus for this purpose.

To illustrate my process, the following is my method of proceeding in the case of whisky:

My first step is to prepare a mash as it is ordinarily prepared for the kind of whisky wanted, and to ferment it in the usual manner.

My second step after that mash has finished fermenting, is to distil it in any one of the well known stills, and at whatever temperature is needed by the particular still used, which is generally a little above 212 degrees, the boiling point of water when the last particles of alcohol are removed before the passing out of the slops. The crude ethyl alcohol coming from that distillation carries with it nearly all the impurities, ethers, aldehydes, fusel oils, etc., whose boiling points are below the points of heat attained during the process of distillation, while the remaining mash, then called slop, is practically free from the said impurities.

My third step is to free the crude ethyl alcohol from the impurities that it carries, by any of the well known methods adapted for that purpose, such as doubling, so-called rectifying.

My fourth step is to slowly boil the slop (remaining from step two) in any simple distilling apparatus at a temperature below the point attained during the distillation described in the second step, and the distilled water so obtained has the flavor and perfume of the particular mash so boiled, but is almost entirely free from impurities previously contained in it. A sufficient amount of water is so produced for the reducing purpose stated in the next step.

My fifth step is then to mix that flavored distilled water, (the result of the fourth step), in the proportion needed, with the purified ethyl alcohol (the result of the third step), which gives a whisky with a flavor similar to that of a potable whisky manufactured in the usual manner from a similar mash, but free from the noxious impurities contained in the latter. To fit such a whisky for drinking, an aging of a few months only is needed.

In the case of brandies, rums and other like liquors, the steps of the process are exactly the same except for the first, with reference to which it is understood that the mash is prepared in the usual manner required for the special liquor to be obtained.

It will be understood that a result similar to the one of step five would be obtained by adding the ethyl alcohol, after it has been purified (steps two and three) to the slop (resultant to step two) and distilling the mixture as in step four, the alcoholic liquid obtained by that distillation being, of course, a mixture of purified ethyl alcohol and flavored water, similar to mixture resultant to step five.

As the aforesaid spirits, whiskies, brandies, rums, etc., when made by the existing processes, are usually made at too high a proof to be so consumed, a certain amount of water is added to reduce them to a potable condition.

My invention is also designed to provide a flavored water for such purposes, and the boiling of a waste mash or slop at a low or any temperature, after the ethyl alcohol has been distilled from it, to obtain a flavored water for this purpose or a similar purpose, belongs to the essence of my invention.

Having thus described my invention, what I claim and desire to secure by Letters Patent is—

1. The process of manufacturing potable spirits, whisky, brandy, rum, etc., free from impurities and having their characteristic flavor, said process consisting in preparing and fermenting in the usual way, the particular mash from which the particular potable spirit is to be produced, distilling the fermented mash in the usual way, removing the impurities from the alcoholic liquid obtained, then heating the slop to separately distil over a certain amount of flavored water, and finally mixing the flavored distilled water so obtained with the purified spirit, thus reducing the latter to the usual proof.

2. The process of manufacturing potable spirits, said process consisting in first manufacturing the spirit in the usual way, and then reducing their proof and adding to their flavor by commingling them with a correspondingly flavored water derived by distillation from the slop of the mash which produced the potable spirit, or from the slop of a similar mash.

3. The process herein described which consists of boiling waste mashes or slops and separately distilling therefrom a flavored water, and then adding the same to an ethyl alcoholic liquid.

In testimony whereof I have hereunto set my hand in presence of two subscribing witnesses.

PIERRE-ARMAND BRANGIER.

Witnesses:
CHARLES A. BUFIELD,
CHARLES EDELMAN.